United States Patent [19]

Arzola

[11] 4,173,834
[45] Nov. 13, 1979

[54] EDUCATIONAL MATHEMATICAL GAME APPARATUS

[76] Inventor: Alberto H. Arzola, 308 Palisade Ave., Jersey City, N.J. 07307

[21] Appl. No.: 825,232

[22] Filed: Aug. 17, 1977

[51] Int. Cl.² ........................................... G09B 19/02
[52] U.S. Cl. ................................. 35/31 R; 35/70; 35/31 G
[58] Field of Search ............... 35/31 R, 31 A, 31 B, 35/31 D, 31 G, 32, 69, 70, 74; 273/299, 302

[56] References Cited

U.S. PATENT DOCUMENTS

| | | | |
|---|---|---|---|
| 705,579 | 7/1902 | Gibson | 35/31 G X |
| 1,528,061 | 3/1925 | Joyce | 35/31 G X |
| 2,769,640 | 11/1956 | Elder | 35/31 G X |
| 3,477,404 | 11/1969 | Robinson | 35/74 UX |
| 3,661,392 | 5/1972 | Abney | 35/31 G X |

*Primary Examiner*—William H. Grieb
*Attorney, Agent, or Firm*—Robert D. Farkas

[57] ABSTRACT

An apparatus for educational use in the playing of mathematical games utilizes forty-four playing cards. Each of the cards bears an enlarged numeral extending over the ranges from one to forty-four. Each card has the same surface carrying the enlarged numeral encoated wtih three multiplication steps and three division steps whereby one common numeral is used in each multiplication step and as a divisor in each division step. None of the numerals is extended beyond number 12 excepting the enlarged identifying numeral. The users record their proficiency in rapid use of each card, when randomly collected, on a score board having four wheels with a score imprinted thereon. The wheels are rotatably secured to a plate having windows exposing the score value on the wheels. Each of the four wheels are separately identified by a color, equivalent to the color of each four separately decorated medallions. The score achieved by the players results in the awarding of the medallion at the end of the play of the forty-four cards in sequence by the four players. Each player is scored as to speed and accuracy utilizing a time clock which may be started and stopped by the operation of two levers.

1 Claim, 7 Drawing Figures

EDUCATIONAL MATHEMATICAL GAME APPARATUS

BACKGROUND OF THE INVENTION

1. The Field of the Invention

This invention relates to educational card games and more particularly to that class of device utilized to teach the user thereof multiplication and division tables in the range of two to twelve.

2. Description of the Prior Art

The prior art abounds with educational and recreational mathematical game devices. U.S. Pat. No. 2,769,640 issued on Nov. 6, 1956 to R. B. Elder discloses a card apparatus each of which teach a single multiplication step and the resulting answer therefrom.

U.S. Pat. No. 705,579 issued on July 29, 1902 to J. Gibson discloses a card apparatus having on one side thereof a pair of numbers used in successive addition, subtraction, multiplication and division. Other cards are disclosed wherein only addition, substraction and multiplication steps are illustrated as well as the answers resulting therefrom.

U.S. Pat. No. 3,661,392 issued on May 9, 1972 to T. M. Abney illustrates a card game which specifies arithmetical relationships in a manner permitting a new and improved arithmetic game to be played for education and entertainment utilizing a plurality of such cards. Each of the cards are disposed having indicia on one face thereof, such indicia being utilized to illustrate the steps of addition, multiplication, division and subtraction. The cards are divided into four columns of numbers wherein some of the cards specify the specific arithmetical step to be performed.

All of the aforementioned patents suffer the common deficiency of failing to teach the simplified operation of multiplication and division of the rudimentary numbers, limited to twelve, by repeated use of the same number in each of three specified multiplication and divisional steps. The aforementioned patents also fail to provide an incentive for learning the tables so as to more rapidly teach the users thereof the art of accuracy and speed in participating in a competitive game between the user and other users of the apparatus.

SUMMARY OF THE INVENTION

A primary object of the present invention is to provide a game suitable to concurrently provide enjoyment whilst educating the user of the apparatus in the basic multiplication and division steps of the numerals two through twelve.

Another object of the present invention is to provide a game apparatus whereby the competitive urge of the user is rewarded by an award of a medallion upon achieving success over the other users of the game apparatus.

A further object of the present invention is to provide a time scoring device keyed to the use of the cards so as to measure the time elapsed whilst running down the arithmetic steps suggested by the cards.

A still further object of the present invention is to provide a game apparatus which continually displays the score achieved by each individual player, which in of itself enhances the teaching of the addition process to the users of the game.

Heretofore, "flash" cards were utilized to teach a singular operation of multiplication and when used in random fashion, taught the user to shorten response time by repeated use so as to increase the facility of multiplication, division, addition and subtraction steps. Such cards required a user and an operator of the cards, otherwise the user would rapidly become bored. However, the operator of the cards did not participate in the learning process. The present invention anticipates this difficulty and the general difficulty of learning routine tasks by mixing together with the learning operation the satisfactory experience of engaging in a competitive game. Hence the components and apparatus of the present invention is specifically designed to be used by individuals who intend to learn the multiplication and division tables from two through twelve, whilst engaging in a competitive sport commensurate with their intellect.

DESCRIPTION OF THE PREFERRED EMBODIMENT

Figure 1:
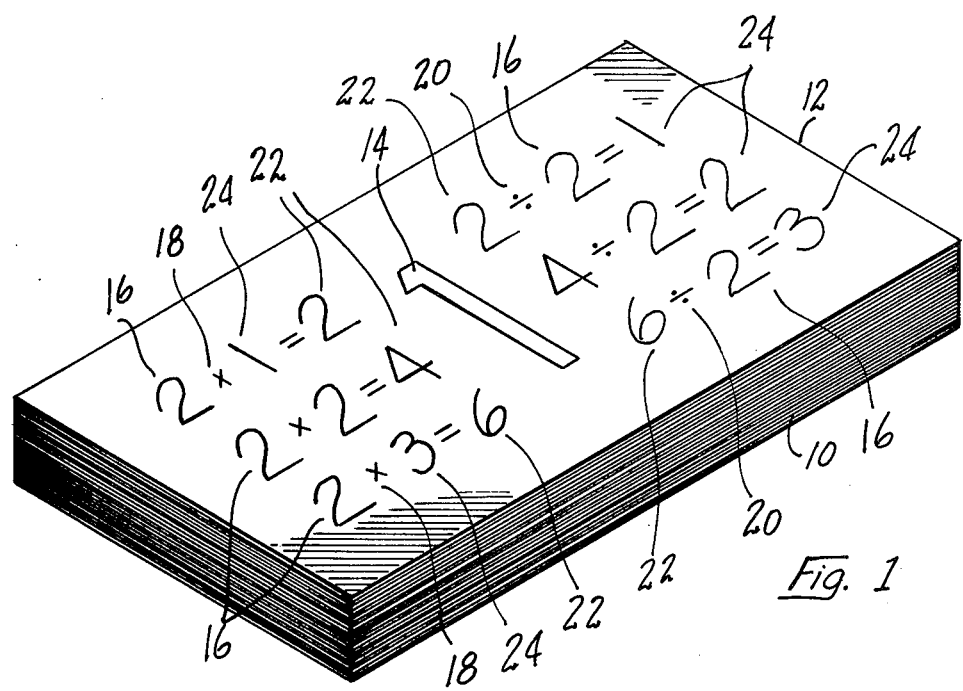
FIG. 1 illustrates a stack of playing cards, with the uppermost having indicia on a lateral surface thereof.
Figure 2:
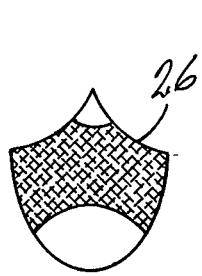
FIG. 2 is a front elevational view of a medallion.
Figure 3:
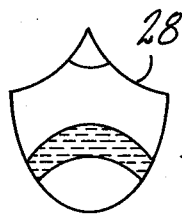
FIG. 3 is a front elevational view of another medallion.
Figure 4:
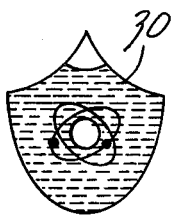
FIG. 4 is a front elevational view of yet another medallion.
Figure 5:
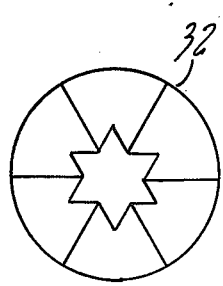
FIG. 5 is a front elevational view of still another medallion.

The structure and method of fabrication of the present invention is applicable to a plurality of forty-four playing cards, each having indicia arranged on one lateral surface thereof. Typically such indicia is arranged into two sets of three mathematical operations. The first set includes utilizing a primary number in three steps of multiplication and the product of those multiplications. The second step includes utilizing the same number in a division step, as the divisor, wherein the product of the multiplication step is the dividend. An enlarged number indicates the scorecard number and ranges from one to forty-four sequentially throughout the quantity of playing cards utilized. Four medallions are provided, each of which has a separate design thereon. Each of the medallions are individually colored so as to be utilized as a prize by each of the four players who are utilizing the game apparatus. The colors range from white, gold, silver and yellow, wherein the white colored medallion represents the first prize, the gold colored medallion represents the second prize, the silver colored medallion represents the thrid prize and the yellow colored medallion represents the fourth prize. Selection of the medallions during the award phase at the conclusion of the play of all forty-four cards, is determined by the score achieved by each individual player when registered on a scoring wheel, each of which is allotted to a player. Accordingly, the four wheels are pivotably secured to a plate adjacent an area wherein the plate is provided with an opening corresponding in juxtaposed position with the lateral surface of the wheel so as to permit the users to view the numerical value depicted by the indicia located on the surface of the wheel. Each player utilizes the wheel, each being individually color coded with white color, gold color, silver color and yellow color, which represents the wheel last used by him during the previous game operation.

The score achieved by each player is measured in terms of time taken to successfully complete each of the three multiplication steps and each of the division steps on each card selected at random by the player, from the top of a stack, by utilizing a time clock therefor. The time clock is provided with a start button and a stop button. In use, the player whose time is to be measured, depresses the start button, proceeds to perform the three steps of multiplication and the three steps of division, and upon successful completion of each of the operations, depresses the stop button. The elapsed time is scored by him and is used in competitive scoring sequentially, in the round following the play of the next three players. The winning player in the round has his enlarged numeral recorded on his wheel. When all forty-four cards have been played out, resulting in a total of eleven cards per player, each player has completed the steps of adding his score for each round on his wheel, further teaching the user the steps of addition. The player with the highest score upon completion of the eleven rounds, is then awarded a medallion in accordance with his position in rank with the other players. The game is then freed to be played all over again with each player now utilizing the appropriately colored wheel, corresponding with the color of his medallion awarded to him from the last game.

Now referring to the Figures and more particularly to the embodiment illustrated in FIG. 1 showing a stack 10 of playing cards, one playing card 12 is provided with an enlarged numerical indicia 14, as shown in the form of numeral one. A common number 16 is disposed in a vertical row, having adjacent thereto the multiplication sign 18. The same common number 16 is disposed in another row to which the division sign 20 is affixed adjacent thereto.

The product numbers 22, resulting from the multiplication step of numeral 16 and numerals 24 is associated with the division sign 20 resulting in a number equivalent to numerals 24.

FIGS. 2 through 5 illustrate medallions 26, 28, 30 and 32 each having the appropriate colors in selected areas with the colors, white, gold, silver and yellow. It is to be noted that the shape of the medallion may differ, as shown, as well as the location and shape of the colored portions thereof.

Figure 6:
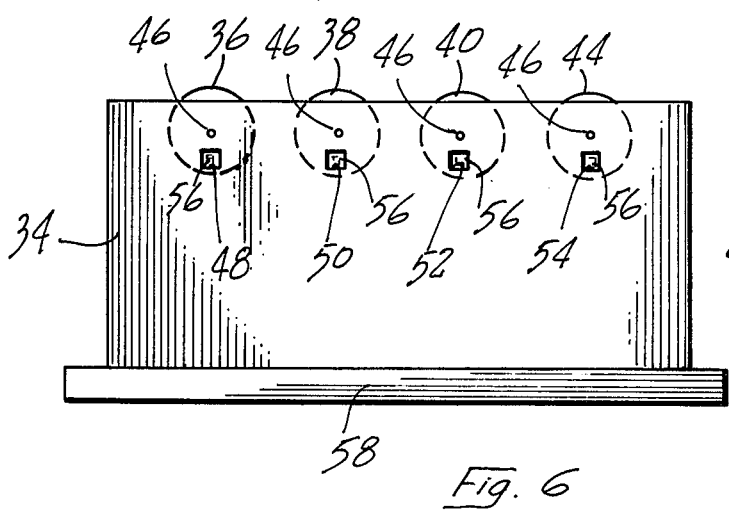
FIG. 6 is a front elevational view of a scoreboard.

FIG. 6 illustrates plate 34 having wheels 36, 38, 40 and 44 pivotably secured about axle rod 46. Each of wheels 36, 38, 40 and 44 have associated openings 48, 50, 52 and 54 respectively, located adjacent thereto. Indicia 56 is disposed on a lateral surface of each of the wheels and may be viewed by peering through openings 48, 50, 52 and 54. Bar 58 is fixedly secured to the bottom of plate 34 so as to permit plate 34 to be vertically disposed when bar 58 is resting on a supporting surface.

Figure 7:
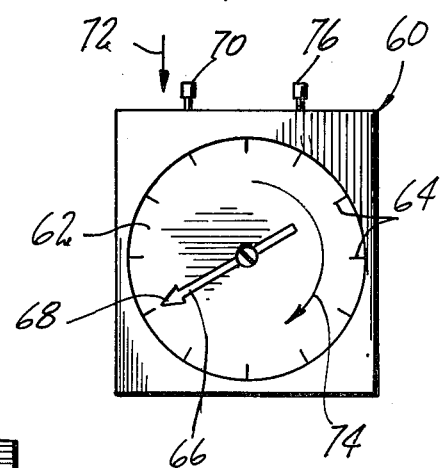
FIG. 7 is a front elevational view of a time clock.

FIG. 7 illustrates time clock 60 having dial 62 and indicia 64 disposed in circular fashion upon dial 62. Pointer 66 is journalled passing through dial 62 such that end 68 thereof indicates selective portions of indicia 64. Operating the lever 70 is utilized by the depression thereof in the direction of arrow 72 to commence the timing cycle of the clock, not shown, and causing the pointer 66 to move in the direction of arrow 74. Upon the depression of lever 76, pointer 66 ceases its rotation, permitting the users of clock apparatus 60 to read the indicia 64 disposed underneath pointer 66. The elapsed time, measured between alternate operations of operating levers 70 and 76 is achieved by subtracting the numerical value depicted by indicia 64, from one another.

One of the advantages of the present invention is a game suitable to concurrently provide enjoyment whilst educating the user of the apparatus in the basic multiplication and division steps of the numerals two through twelve.

Another advantage of the present invention is a game apparatus whereby the competitive urge of the user is rewarded by an award of a medallion upon achieving success over the other users of the game apparatus.

A further advantage of the present invention is a time scoring device keyed to the use of the cards so as to measure the time elapsed whilst running down the arithmetic steps suggested by the cards.

A still further advantage of the present invention is a game apparatus which continually displays the score achieved by each individual player, which in of itself enhances the teaching of the addition process to the users of the game.

Thus there is disclosed in the above description and in the drawings, an embodiment of the invention which fully and effectively accomplishes the objects thereof. Hover, it will become apparent to those skilled in the art, how to make variations and modifications to the instant invention. Therefore, this invention is to be limited, not by the specific disclosure herein, but only by the appending claim.

The embodiment of the invention in which an exclusive privilege or property is claimed are defined as follows:

1. A plurality of playing cards, one lateral surface of each of said cards bearing indicia, including three formulas for numeral multiplication, said indicia including three formulas for numeral division, each of said formulas for numeral multiplication and each of said formulas for numeral division utilizing one common number as a multiplicand and as a divisor respectively, said one common number ranging from two to twelve, each of said formulas for multiplication and each of said formulas for division including an equal sign, each of said formulas for multiplication including a numeral representing the product of multiplication, each of said three formulas for division including individually one of said numerals representing said three products of multiplication as a dividend in said formulas for division, said three formulas for division including quotients, each of said three formulas for multiplication including one of three numbers as a multiplicand, each of said three numbers having a different numerical value, and equaling in numerical value said quotients, an enlarged numeral, each of said plurality of playing cards being identified by a different enlarged numeral, said different enlarged numeral being in sequential order, said enlarged numeral being located intermediate said three formulas for multiplication and said three formulas for division, said plurality of playing cards being forty-four in number, means to evaluate a score achieved by the users of said plurality of playing cards, said means including four wheels, said four wheels each being pivotably secured to a plate, said plate having four openings therein, said openings being disposed juxtaposed with the location of each of said four wheels, each of said four wheels suitably identified by an individual color, each of said four wheels carrying numerical indicia thereon, whereby said numerical indicia carried by said each of said four wheels may be viewed through said four openings, four individually colored and individually decorated medallions, each of said medallions having an equivalent color to said identifying color of said four wheels, a time clock, said clock for timing the completion of the use of said cards by said users, said clock including a manual start button and a manual stop button for operating a pointer of said clock.

* * * * *